United States Patent
Berg et al.

(10) Patent No.: US 10,465,937 B2
(45) Date of Patent: Nov. 5, 2019

(54) HYBRID TANDEM COMPRESSOR SYSTEM AND METHOD OF USE

(71) Applicant: Lennox Industries Inc., Richardson, TX (US)

(72) Inventors: Eric Berg, The Colony, TX (US); Ajay Iyengar, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 91 days.

(21) Appl. No.: 15/671,243

(22) Filed: Aug. 8, 2017

(65) Prior Publication Data
US 2019/0049130 A1 Feb. 14, 2019

(51) Int. Cl.
| | | |
|---|---|---|
| F24F 11/00 | (2018.01) | |
| F24F 11/83 | (2018.01) | |
| F25B 49/02 | (2006.01) | |
| F24F 11/85 | (2018.01) | |
| F24F 110/22 | (2018.01) | |
| F24F 110/12 | (2018.01) | |

(52) U.S. Cl.
CPC ............ F24F 11/83 (2018.01); F25B 49/022 (2013.01); *F24F 11/85* (2018.01); *F24F 2110/12* (2018.01); *F24F 2110/22* (2018.01); *F25B 2400/0751* (2013.01); *F25B 2600/0253* (2013.01)

(58) Field of Classification Search
CPC .................. F25B 49/022; F25B 49/025; F25B 2400/075; F25B 2400/0751; F25B 2600/0253
See application file for complete search history.

(56) References Cited

U.S. PATENT DOCUMENTS

| | | | |
|---|---|---|---|
| 3,243,101 A | | 3/1966 | Shaw |
| 3,386,262 A | | 6/1968 | Hackbart et al. |
| 3,785,169 A | | 1/1974 | Gylland, Jr. |
| 4,141,676 A | | 2/1979 | Jannen et al. |
| 4,269,261 A | * | 5/1981 | Kountz ............... F24D 19/1039 237/2 A |
| 4,383,802 A | | 5/1983 | Gianni et al. |
| 4,729,228 A | | 3/1988 | Johnsen |
| 5,094,598 A | | 3/1992 | Amata et al. |

(Continued)

FOREIGN PATENT DOCUMENTS

| | | |
|---|---|---|
| EP | 0403239 A2 | 12/1990 |
| EP | 1120611 A1 | 8/2001 |

OTHER PUBLICATIONS

U.S. Appl. No. 15/464,470, Thobias et al.

(Continued)

*Primary Examiner* — Jonathan Bradford
(74) *Attorney, Agent, or Firm* — Winstead PC

(57) ABSTRACT

A compressor system includes a variable-speed compressor and a fixed-speed compressor. A control unit is operatively coupled to the variable-speed compressor and is operatively coupled to the fixed-speed compressor. A sensor is operatively coupled to the control unit and disposed in an enclosed space. The sensor measures at least one of a temperature and a relative humidity of the enclosed space and determines an HVAC load of the enclosed space. Responsive to a determination of the HVAC load, the control unit directs operation of the variable-speed compressor and the fixed-speed compressor.

15 Claims, 9 Drawing Sheets

(56) References Cited

U.S. PATENT DOCUMENTS

| | | |
|---|---|---|
| 6,186,758 B1 | 2/2001 | Shaw |
| 6,928,828 B1 | 8/2005 | Taras et al. |
| 6,948,916 B2 | 9/2005 | Hebert |
| 7,325,414 B2 | 2/2008 | Taras et al. |
| 7,469,555 B2 | 12/2008 | Taras et al. |
| 7,651,322 B2 | 1/2010 | Shaw |
| 8,215,122 B2 * | 7/2012 | Hyun ................ F25B 13/00 62/200 |
| 8,641,395 B2 | 2/2014 | Nemit, Jr. |
| 9,551,351 B2 | 1/2017 | De Bernardi et al. |
| 9,599,118 B2 * | 3/2017 | Zhou ................ F04B 27/14 |
| 2005/0091998 A1 | 5/2005 | Cho et al. |
| 2006/0225445 A1 | 10/2006 | Lifson et al. |

OTHER PUBLICATIONS

U.S. Appl. No. 15/464,606, Goel et al.
U.S. Appl. No. 15/606,571, Goel et al.
U.S. Appl. No. 15/824,060, Goel et al.

\* cited by examiner

| MODE | LOAD | OPERATION |
|---|---|---|
| VSPD ONLY | LOAD < VSPD COMPRESSOR MAX CAPACITY | VARIABLE SPEED COMPRESSOR WILL CYCLE ON MINIMUM SPEED OR MODULATED SPEED TO MATCH LOAD |
| VSPD MIN + FIXED | VSPD MAX CAPACITY < LOAD < VSPD MIN + FIXED CAPACITY | VARIABLE SPEED COMPRESSOR WILL RUN AT MINIMUM SPEED AND FIXED SPEED COMPRESSOR WILL CYCLE ON AND OFF TO MATCH LOAD |
| VSPD + FIXED | VSPD MIN + FIXED CAPACITY < LOAD | FIXED SPEED COMPRESSOR RUNS CONTINUOUSLY, VARIABLE SPEED COMPRESSOR MODULATES TO MATCH LOAD |
| VSPD + FIXED | VSPD MAX + FIXED CAPACITY < LOAD | FIX SPEED COMPRESSOR AND VARIABLE SPEED COMPRESSOR AT MAX SPEED RUN CONTINUOUSLY |

COOLING MODE OPERATION

FIG. 1C

HEATING MODE OPERATION

| MODE | LOAD | OPERATION |
|---|---|---|
| VSPD ONLY | LOAD < VSPD COMPRESSOR MAX CAPACITY | VARIABLE SPEED COMPRESSOR WILL CYCLE ON MINIMUM SPEED OR MODULATED SPEED TO MATCH LOAD |
| VSPD MIN + FIXED | VSPD MAX CAPACITY < LOAD < VSPD MIN + FIXED CAPACITY | VARIABLE SPEED COMPRESSOR WILL RUN AT MINIMUM SPEED AND FIXED SPEED COMPRESSOR WILL CYCLE ON AND OFF TO MATCH LOAD |
| VSPD + FIXED | VSPD MIN + FIXED CAPACITY < LOAD | FIXED SPEED COMPRESSOR RUNS CONTINUOUSLY, VARIABLE SPEED COMPRESSOR MODULATES TO MATCH LOAD UP TO MAX HEATING SPEED |
| VSPD (OVERSPEED) + FIXED | VSPD MAX + FIXED CAPACITY < LOAD | FIX SPEED COMPRESSOR RUN CONTINUOUSLY AND VARIABLE SPEED COMPRESSOR OPERATES ABOVE MAX HEATING SPEED TO MATCH LOAD |

FIG. 2A

HYBRID TANDEM COMPRESSOR SYSTEM AND METHOD OF USE

TECHNICAL FIELD

The present disclosure relates primarily to heating, ventilation, and air conditioning ("HVAC") systems and more particularly, but not by way of limitation, to HVAC systems having multiple compressors including a variable-speed compressor and a fixed-speed compressor.

BACKGROUND

Compressor systems are commonly utilized in HVAC applications. In an effort to improve efficiency of HVAC system, variable-speed compressors are often utilized. Such variable-speed compressors allow the compressor speed, and thus the compressor capacity, to be modulated according to an HVAC load in an enclosed space. Oftentimes, an ability of a particular HVAC system to add or remove heat is limited by a minimum capacity of the variable-speed compressor. That is, in situations where there is a small cooling load or a small heating load, the variable-speed compressor cannot maintain the desired environmental conditions while operating on a continuous basis. In these situations it becomes necessary to operate the variable-speed compressor in repeated on/off cycles. This practice, known as "cycling" introduces further inefficiencies to the HVAC system during periods of low cooling load or low heating load.

SUMMARY

In one aspect, the present disclosure relates to a compressor system that includes a variable-speed compressor and a fixed-speed compressor. A control unit is operatively coupled to the variable-speed compressor and is operatively coupled to the fixed-speed compressor. A sensor is operatively coupled to the control unit and disposed in an enclosed space. The sensor measures at least one of a temperature and a relative humidity of the enclosed space and determines an HVAC load of the enclosed space. Responsive to a determination of the HVAC load, the control unit directs operation of the variable-speed compressor and the fixed-speed compressor.

In another aspect, the present disclosure relates to a method of controlling an HVAC system. The method includes measuring, using a sensor, environmental conditions of an enclosed space. Responsive to the measuring, an HVAC load present in the enclosed space is determined using a control unit. The HVAC load is compared to a rated minimum capacity of a variable-speed compressor, a rated maximum capacity of the variable-speed compressor, and a capacity of a fixed-speed compressor. Responsive to the comparing, operation of at least one of the variable-speed compressor and the fixed-speed compressor is directed using the control unit.

In another aspect, the present disclosure relates to a computer-program product that includes a non-transitory computer-usable medium having computer-readable program code embodied therein. The computer-readable program code adapted to be executed to implement a method. The method includes receiving from a sensor a signal corresponding to a measurement of environmental conditions in an enclosed space. An HVAC load present in the enclosed space is determined based on the environmental conditions. The HVAC load is compared to a rated minimum capacity of a variable-speed compressor, a rated maximum capacity of the variable-speed compressor, and a capacity of a fixed-speed compressor. The variable-speed compressor and the fixed-speed compressor are signaled responsive to the comparison of the HVAC load to the rated minimum capacity of the variable-speed compressor, the rated maximum capacity of the variable-speed compressor, and the capacity of the fixed-speed compressor.

BRIEF DESCRIPTION OF THE DRAWINGS

For a more complete understanding of the present disclosure and for further objects and advantages thereof, reference may now be had to the following description taken in conjunction with the accompanying drawings in which:

FIG. 1C is a table illustrating modes of operation of the illustrative tandem compressor system in a cooling mode;

FIG. 2A is a table showing modes of operation of the illustrative tandem compressor system in a heating mode;

DETAILED DESCRIPTION

Various embodiments will now be described more fully with reference to the accompanying drawings. The disclosure may, however, be embodied in many different forms and should not be construed as limited to the embodiments set forth herein.

Figure 1A:
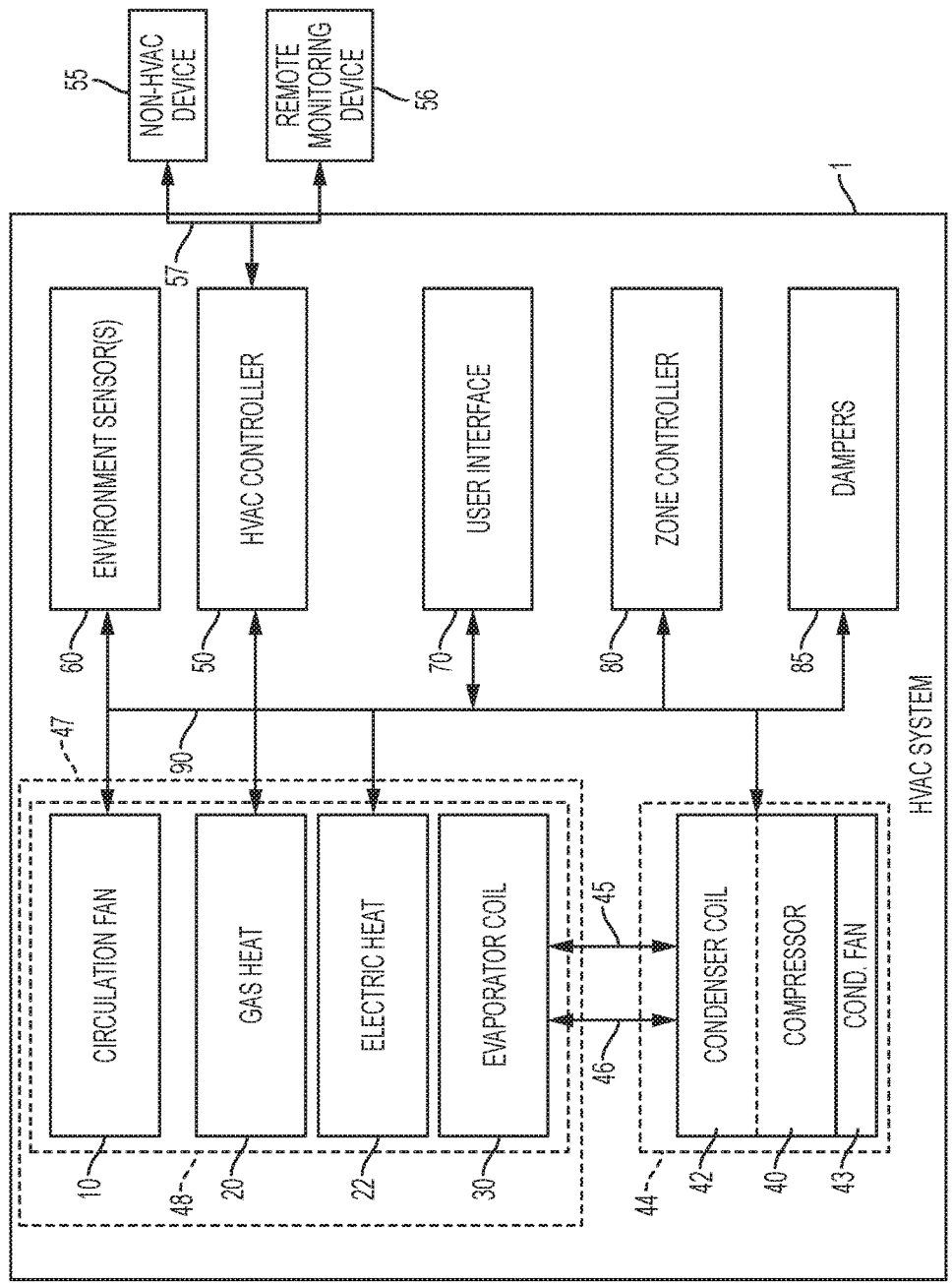
FIG. 1A is a block diagram of an HVAC system.

FIG. 1A illustrates an HVAC system 1. In a typical embodiment, the HVAC system 1 is a networked HVAC system that is configured to condition air via, for example, heating, cooling, humidifying, or dehumidifying air. The HVAC system 1 can be a residential system or a commercial system such as, for example, a roof top system. For exemplary illustration, the HVAC system 1 as illustrated in FIG. 1A includes various components; however, in other embodiments, the HVAC system 1 may include additional components that are not illustrated but typically included within HVAC systems.

The HVAC system 1 includes a circulation fan 10, a gas heat 20, an electric heat 22 typically associated with the circulation fan 10, and a refrigerant evaporator coil 30, also typically associated with the circulation fan 10. The circulation fan 10, the gas heat 20, the electric heat 22, and the refrigerant evaporator coil 30 are collectively referred to as an "indoor unit" 48. In a typical embodiment, the indoor unit 48 is located within, or in close proximity to, an enclosed space 47. The HVAC system 1 also includes a compressor 40, an associated condenser coil 42, and a condenser fan 43, which are typically referred to as an "outdoor unit" 44. In various embodiments, the outdoor unit 44 is, for example, a rooftop unit or a ground-level unit. The compressor 40 and the associated condenser coil 42 are connected to an associated evaporator coil 30 by a refrigerant liquid line 46 and a refrigerant vapor line 45. In a typical embodiment, the compressor 40 is, for example, a single-stage compressor, a multi-stage compressor, a single-speed compressor, or a variable-speed compressor. Also, as will be discussed in more detail below, in various embodiments, the compressor 40 may be a compressor system including at least two compressors of similar or different capacities. The circulation fan 10, sometimes referred to as a blower may, in some embodiments, be configured to operate at different capacities (i.e., variable motor speeds) to circulate air through the HVAC system 1, whereby the circulated air is conditioned and supplied to the enclosed space 47.

Still referring to FIG. 1A, the HVAC system 1 includes an HVAC controller 50 that is configured to control operation of the various components of the HVAC system 1 such as, for example, the circulation fan 10, the gas heat 20, the electric heat 22, and the compressor 40. In some embodiments, the HVAC system 1 can be a zoned system. In such embodiments, the HVAC system 1 includes a zone controller 80, dampers 85, and a plurality of environment sensors 60. In a typical embodiment, the HVAC controller 50 cooperates with the zone controller 80 and the dampers 85 to regulate the environment of the enclosed space 47.

The HVAC controller 50 may be an integrated controller or a distributed controller that directs operation of the HVAC system 1. In a typical embodiment, the HVAC controller 50 includes an interface to receive, for example, thermostat calls, temperature setpoints, blower control signals, environmental conditions, and operating mode status for various zones of the HVAC system 1. In a typical embodiment, the HVAC controller 50 also includes a processor and a memory to direct operation of the HVAC system 1 including, for example, a speed of the circulation fan 10.

Still referring to FIG. 1A, in some embodiments, the plurality of environment sensors 60 is associated with the HVAC controller 50 and also optionally associated with a user interface 70. In some embodiments, the user interface 70 provides additional functions such as, for example, operational, diagnostic, status message display, and a visual interface that allows at least one of an installer, a user, a support entity, and a service provider to perform actions with respect to the HVAC system 1. In some embodiments, the user interface 70 is, for example, a thermostat of the HVAC system 1. In other embodiments, the user interface 70 is associated with at least one sensor of the plurality of environment sensors 60 to determine the environmental condition information and communicate that information to the user. The user interface 70 may also include a display, buttons, a microphone, a speaker, or other components to communicate with the user. Additionally, the user interface 70 may include a processor and memory that is configured to receive user-determined parameters, and calculate operational parameters of the HVAC system 1 as disclosed herein.

In a typical embodiment, the HVAC system 1 is configured to communicate with a plurality of devices such as, for example, a monitoring device 56, a communication device 55, and the like. In a typical embodiment, the monitoring device 56 is not part of the HVAC system. For example, the monitoring device 56 is a server or computer of a third party such as, for example, a manufacturer, a support entity, a service provider, and the like, in other embodiments, the monitoring device 56 is located at an office of, for example, the manufacturer, the support entity, the service provider, and the like.

In a typical embodiment, the communication device 55 is a non-HVAC device having a primary function that is not associated with HVAC systems. For example, non-HVAC devices include mobile-computing devices that are configured to interact with the HVAC system 1 to monitor and modify at least some of the operating parameters of the HVAC system 1. Mobile computing devices may be, for example, a personal computer (e.g., desktop or laptop), a tablet computer, a mobile device (e.g., smart phone), and the like. In a typical embodiment, the communication device 55 includes at least one processor, memory and a user interface, such as a display. One skilled in the art will also understand that the communication device 55 disclosed herein includes other components that are typically included in such devices including, for example, a power supply, a communications interface, and the like.

The zone controller 80 is configured to manage movement of conditioned air to designated zones of the enclosed space 47. Each of the designated zones include at least one conditioning or demand unit such as, for example, the gas heat 20 and at least one user interface 70 such as, for example, the thermostat. The zone-controlled HVAC system 1 allows the user to independently control the temperature in the designated zones. In a typical embodiment, the zone controller 80 operates electronic dampers 85 to control air flow to the zones of the enclosed space 47.

In some embodiments, a data bus 90, which in the illustrated embodiment is a serial bus, couples various components of the HVAC system 1 together such that data is communicated therebetween. In a typical embodiment, the data bus 90 may include, for example, any combination of hardware, software embedded in a computer readable medium, or encoded logic incorporated in hardware or otherwise stored (e.g., firmware) to couple components of the HVAC system 1 to each other. As an example and not by way of limitation, the data bus 90 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 90 may include any number, type, or configuration of data buses 90, where appropriate. In particular embodiments, one or more data buses 90 (which may each include an address bus and a data bus) may couple the HVAC controller 50 to other components of the HVAC system 1. In other embodiments, connections between various components of the HVAC system 1 are wired. For example, conventional cable and contacts may be used to couple the HVAC controller 50 to the various components. In some embodiments, a wireless connection is employed to provide at least some of the connections between components of the HVAC system such as, for example, a connection between the HVAC controller 50 and the variable-speed circulation fan 10 or the plurality of environment sensors 60.

Figure 1B:
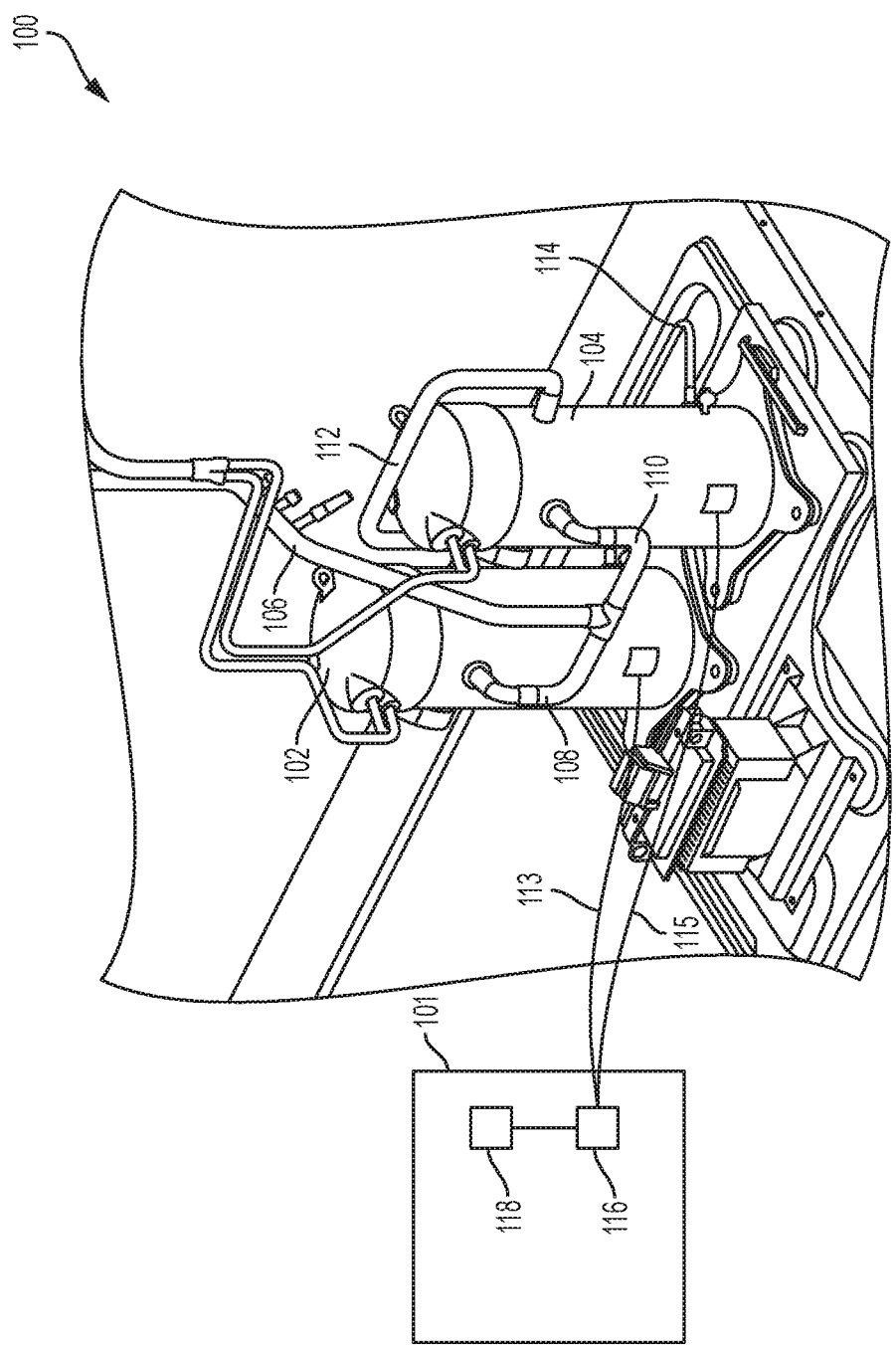
FIG. 1B is a schematic diagram of an illustrative tandem compressor system.

FIG. 1B is a schematic diagram of an illustrative tandem compressor system 100. The illustrative tandem compressor system 100 includes a fixed-speed compressor 102 and a variable-speed compressor 104. A suction equalization line 112 is fluidly coupled to the fixed-speed compressor 102 and the variable-speed compressor 104. A first branch suction line 108 is coupled to the fixed-speed compressor 102 and a second branch suction line 110 is coupled to the variable-speed compressor 104. The first branch suction line 108 and the second branch suction line 110 are each fluidly coupled to a main suction line 106. An oil equalization line 114 couples the fixed-speed compressor 102 and the variable-speed compressor 104. A first relay 113 is electrically coupled to the fixed-speed compressor 102 and a second relay 115 is electrically coupled to the variable-speed compressor 104. The first relay 113 and the second relay 115 are electrically connected to a control unit 116. The control unit 116 is electrically connected to a sensor 118. In a typical embodiment, the sensor 118 is capable of detecting environmental conditions such as, for example, temperature and relative humidity of an enclosed space 101 and converting the measured environmental conditions to an electrical signal. The electrical signal is then transmitted from the sensor 118 to the control unit 116. In a typical embodiment, the control unit 116 employs a control algorithm that determines a cooling load present in the enclosed space 101 based on the electrical signal received from the sensor 118. Responsive to the determination of the cooling load, the control unit 116 signals at least one of the the fixed-speed compressor 102 and the variable-speed compressor 104 to operate at a specific capacity.

FIG. 1C is a table illustrating modes of operation of the illustrative tandem compressor system 100 in a cooling mode. For purposes of discussion, FIG. 1C is described herein relative to FIG. 1B. In a first mode of operation 150, the cooling load measured by the sensor 118 is less than a maximum capacity of the variable-speed compressor 104. For purposes of illustration, the variable-speed compressor 104 is noted in FIG. 1C as "Vspd" and the fixed-speed compressor 102 is noted as "Fixed." In the first mode of operation 150, the fixed-speed compressor 102 is deactivated and the variable-speed compressor 104 cycles between an activated state and a deactivated state or operates continuously at a rated minimum speed of the variable-speed compressor 104 to match the cooling load.

In a second mode of operation 152, the cooling load measured by the sensor 118 is between the rated maximum capacity of the variable-speed compressor and a sum of the capacity of the fixed-speed compressor 102 and the rated minimum capacity of the variable-speed compressor 104. In the second mode of operation 152, the variable-speed compressor 104 runs at the rated minimum speed and the fixed-speed compressor 102 cycles between an activated state and a deactivated state to match the cooling load. Alternatively, in the second mode of operation 152, the variable-speed compressor 104 operates in an overspeed mode while the fixed-speed compressor 102 is deactivated. In a typical embodiment, "overspeed mode" refers to a mode of operation where the variable-speed compressor 104 operates at a speed above the rated maximum speed of the variable-speed compressor In such a scenario, the variable-speed compressor 104 is operated above the rated maximum capacity of the variable-speed compressor such that an operating capacity of the variable-speed compressor is equal to the sum of the capacity of the fixed-speed compressor 102 and the rated minimum capacity of the variable-speed compressor 104.

In a third mode of operation 154, the cooling load is greater than a sum of the rated minimum capacity of the variable-speed compressor 104 and the capacity of the fixed-speed compressor 102. In the third mode of operation 154, the fixed-speed compressor 102 runs continuously and the speed of the variable-speed compressor 104 modulates to match the measured cooling load. As used herein, the term "modulates" refers to adjustment of the speed of the variable-speed compressor 104 to a value between the rated minimum speed and a rated maximum speed of the variable-speed compressor 104.

In a fourth mode of operation 156, the cooling load is greater than the sum of the maximum capacity of the variable-speed compressor 104 and the capacity of the fixed-speed compressor 102. In the fourth mode of operation 156, the variable-speed compressor 104 runs continuously at the rated maximum speed and the fixed-speed compressor 102 runs continuous in an effort to match the measured cooling load.

Figure 1D:
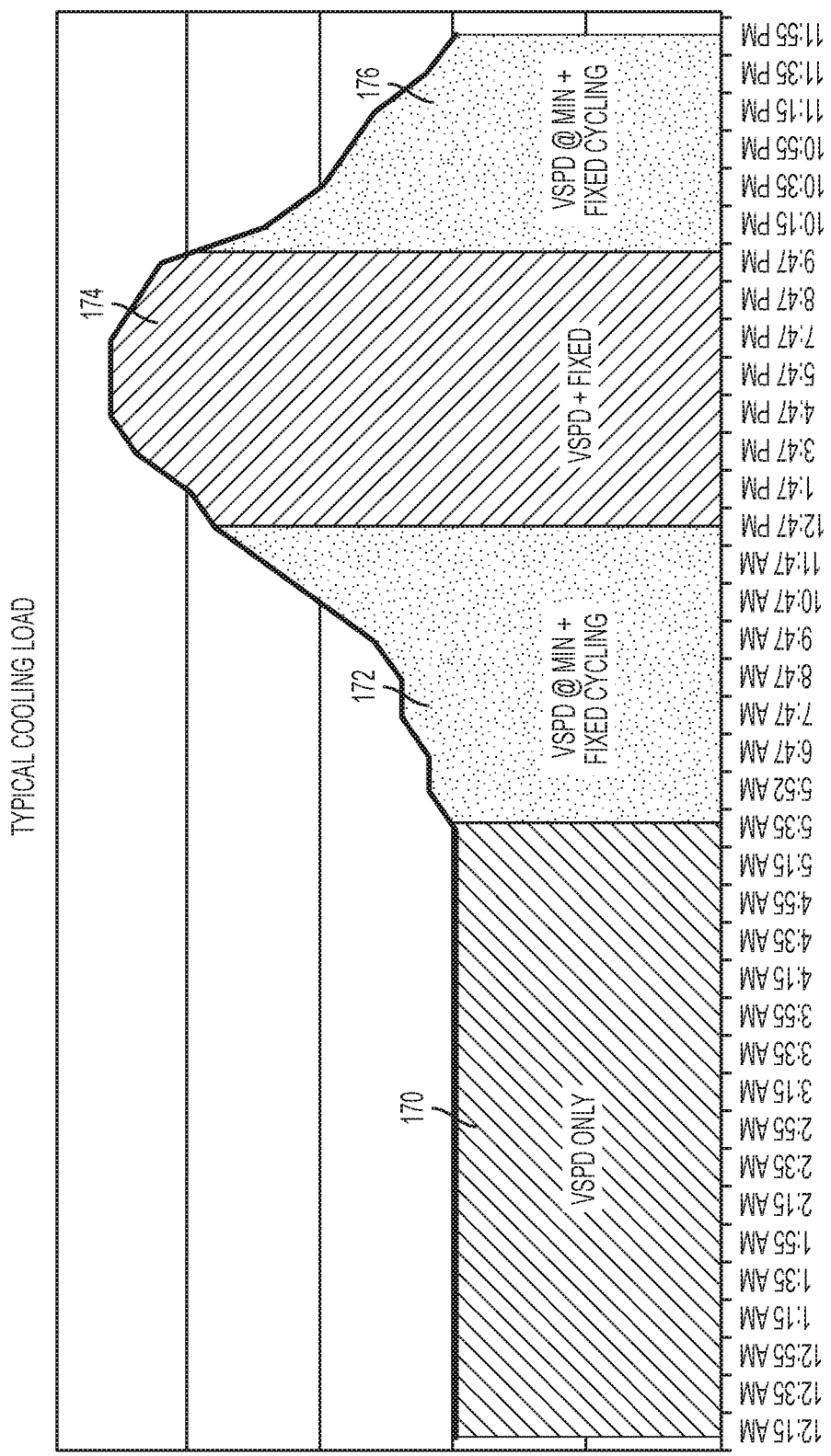
FIG. 1D is a graph that illustrates various modes of operation of the illustrative tandem compressor system in the cooling mode.

FIG. 1D is a graph that illustrates various modes of operation of the illustrative tandem compressor system 100 in a cooling mode. For purposes of discussion, FIG. 1D is described herein relative to FIGS. 1B and 1C. A first region 170 illustrates a first cooling load that is accommodated by use of only the variable-speed compressor 104. In the first region 170, the variable-speed compressor 104 may either operate at a speed that is modulated between the rated minimum speed and the rated maximum speed of the variable-speed compressor 104. Alternatively, in region 170, the variable-speed compressor 104 may be operated with a constant speed at the rated minimum speed. In still other embodiments, in the first region 170, the variable-speed compressor 104 may cycle between an operational state at minimum speed and a deactivated state if the cooling load is below the rated minimum capacity of the variable-speed compressor 104. The first region 170 corresponds to operation of the illustrative tandem compressor system 100 in the first mode of operation 150.

A second region 172 illustrates a second cooling load that is higher than the first cooling load. In the second region 172, the variable-speed compressor 104 operates at the rated minimum speed and the fixed-speed compressor 102 cycles between an activated state and a deactivated state. The second region 172 corresponds to operation of the illustrative tandem compressor system 100 in the second mode of operation 152.

A third region 174 illustrates a third cooling load that is higher than the second cooling load. In the third region 174, the fixed-speed compressor 102 operates continuously and a speed of the variable-speed compressor 104 modulates between the rated minimum rated speed and the rated maximum speed of the variable-speed compressor 104 in order to match the measured cooling load. In various embodiments, the speed of the variable-speed compressor is modulated to an intermediate speed between the rated minimum speed and the rated maximum speed of the variable-speed compressor 104 in an effort to match the measured cooling load. The third region 174 corresponds to operation of the illustrative tandem compressor system 100 in the third mode of operation 154 and in the fourth mode of operation 156. A fourth region 176 illustrates a cooling load that is similar to the second region 172.

FIG. 2A is a table showing modes of operation of the illustrative tandem compressor system 100 in a heating mode. In a first mode of operation 202, the heating load measured by the sensor 118 is less than a maximum capacity of the variable-speed compressor 104. In the first mode of operation 202, the fixed-speed compressor 102 is deactivated and the variable-speed compressor 104 cycles between an activated state and a deactivated state or operates continuously the rated minimum speed in order to match the heating load. Alternatively, a speed of the variable-speed compressor 104 is modulated to match the measured heating load.

In a second mode of operation 204, the heating load measured by the sensor 118 is between the maximum capacity of the variable-speed compressor and a sum of the capacity of the fixed-speed compressor 102 and the rated minimum capacity of the variable-speed compressor 104. In the second mode of operation 204, the variable-speed compressor 104 runs at the rated minimum speed and the fixed-speed compressor 102 cycles between an activated state and a deactivated state to match the heating load. Alternatively, in the second mode of operation 204, the variable-speed compressor 104 operates in an overspeed mode while the fixed-speed compressor 102 is deactivated. In a typical embodiment, "overspeed mode" refers to a mode of operation where the variable-speed compressor 104 operates at a speed above the rated maximum speed of the variable-speed compressor In such a scenario, the variable-speed compressor 104 is operated above the rated maximum capacity of the variable-speed compressor such that an operating capacity of the variable-speed compressor is equal to the sum of the capacity of the fixed-speed compressor 102 and the rated minimum capacity of the variable-speed compressor 104.

In a third mode of operation 206, the heating load is greater than the sum of the rated minimum capacity of the variable-speed compressor 104 and the capacity of the fixed-speed compressor 102. In the third mode of operation 206, the fixed-speed compressor 102 runs continuously and the speed of the variable-speed compressor 104 modulates to a value between the rated minimum speed and the rated maximum speed of the variable-speed compressor 104 to match the measured heating load.

In a fourth mode of operation 208, the heating load is greater than the sum of the maximum capacity of the variable-speed compressor 104 and the capacity of the fixed-speed compressor 102. In the fourth mode of operation 208, the variable-speed compressor 104 runs continuously at the rated maximum speed of the variable-speed compressor and the fixed-speed compressor 102 runs continuously in an effort to match the measured heating load. Alternatively, in the fourth mode of operation 208, the variable-speed compressor 104 runs in an overspeed mode, thereby providing more heating capacity during periods of high heating loads. In a typical embodiment, "overspeed mode" refers to a mode of operation where the variable-speed compressor 104 operates at a speed above the rated maximum speed of the variable-speed compressor.

Figure 2B:
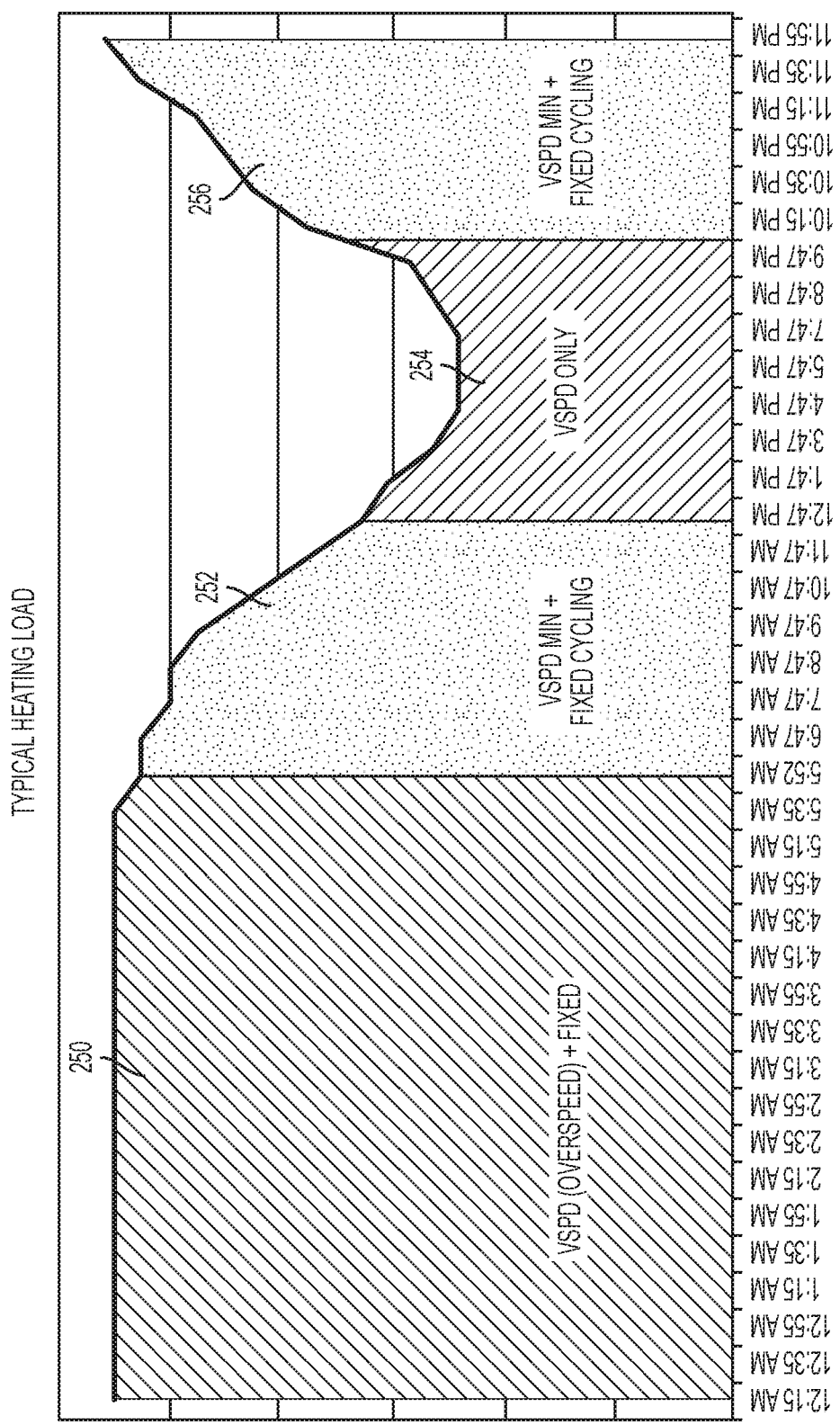
FIG. 2B is a graph that that illustrates various modes of operation of the illustrative tandem compressor system in the heating mode.

FIG. 2B is a graph that illustrates various modes of operation of the illustrative tandem compressor system 100 in the heating mode. For purposes of discussion, FIG. 2B is described herein relative to FIG. 1B. A first region 250 illustrates a first heating load sufficient to necessitate operation of the fixed-speed compressor 102 together with the variable-speed compressor 104. In the first region 250, the variable-speed compressor 104 operates at the rated maximum speed of the variable-speed compressor 104 or in the overspeed mode. The first region 250 corresponds to operation of the illustrative tandem compressor system in the fourth mode of operation 208.

A second region 252 illustrates a second heating load that is lower than the first heating load. In the second region 252, the variable-speed compressor 104 operates at the rated minimum speed and the fixed-speed compressor 102 cycles between an operational state and a deactivated state to match the heating load. Alternatively, in the second region 252, the fixed-speed compressor 102 operates continuously and a speed of the variable-speed compressor 104 modulates between the rated minimum speed and the rated maximum speed of the variable-speed compressor 104 in an effort to match the heating load. The second region 252 corresponds to operation of the illustrative tandem compressor system 100 in the second mode of operation 204 and the third mode of operation 206.

A third region 254 illustrates a third heating load that is lower than the second heating load. In the third region 254, the variable-speed compressor 104 operates and the fixed-speed compressor is deactivated. In region 254, a speed of the variable-speed compressor 104 is modulated to match the heating load. The third region 254 corresponds to operation of the illustrative tandem compressor system 100 in the first mode of operation 202. A fourth region 256 illustrates a heating load that is similar to the second region 252.

Figure 2C:
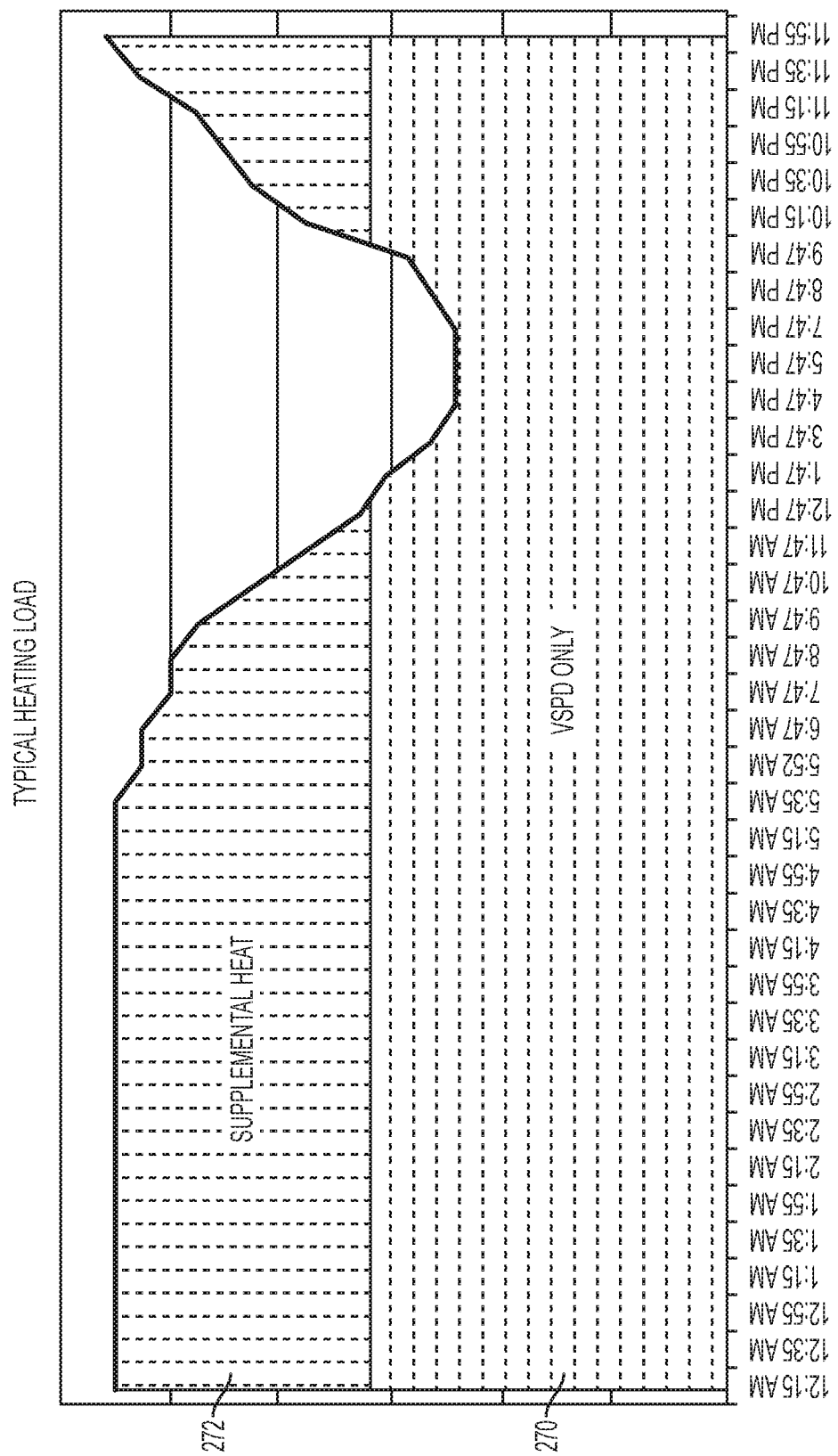
FIG. 2C is a table that illustrates compressor usage of the illustrative tandem compressor system in heating mode.

FIG. 2C is a table that illustrates compressor usage of the illustrative tandem compressor system 100 in the heating mode. Region 270 illustrates heating loads that are accommodated by the variable-speed compressor 104. Region 272 illustrates heating loads that are greater than the heating loads in the region 270. The heating load in the region 272 is accommodated by the fixed-speed compressor 102 and the variable-speed compressor 104.

Figure 3A:
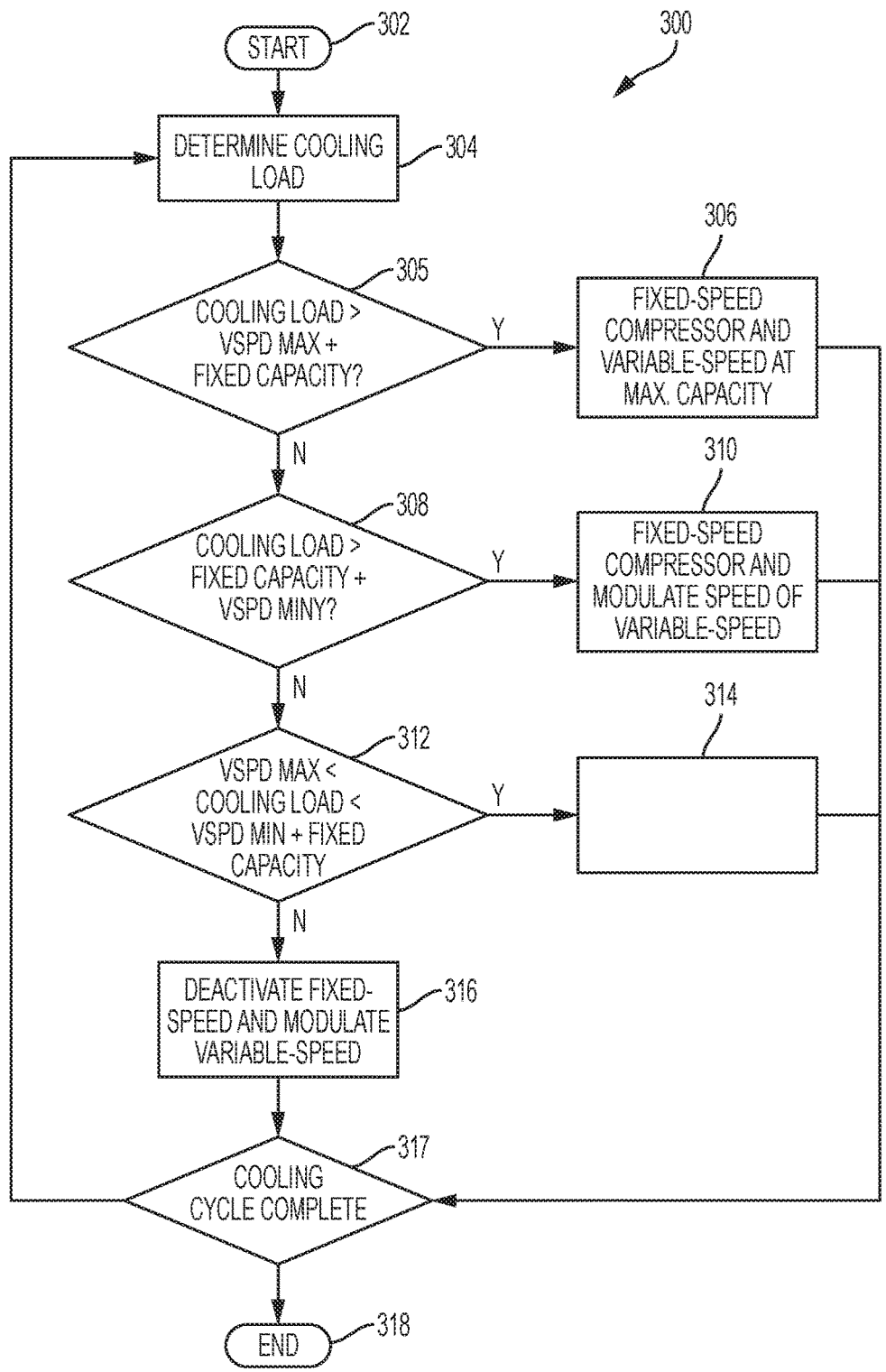
FIG. 3A is a flow diagram illustrating a process of using the illustrative tandem compressor system in the cooling mode.

FIG. 3A is a flow diagram illustrating a process 300 of using the illustrative tandem compressor system 100 in the cooling mode. For purposes of discussion, FIG. 3A is described herein relative to FIG. 1B. The process 300 begins at step 302. At step 304, the cooling load of the enclosed space 101 is determined. At step 305, it is determined whether the cooling load is greater than a sum of the capacity of the fixed-speed compressor 102 and the maximum capacity of the variable-speed compressor 104. From step 305, if it is determined that the cooling load is greater than a sum of the capacity of the fixed-speed compressor 102 and the maximum capacity of the variable-speed compressor 104, the process 300 proceeds to step 306. At step 306, the fixed-speed compressor 102 runs continuously and the variable-speed compressor 104 runs continuously at maximum capacity in an effort to match the measured cooling load. If it is determined at step 305 that the cooling load is less than a sum of the capacity of the fixed-speed compressor 102 and the maximum capacity of the variable-speed compressor 104, the process 300 proceeds to step 308.

At step 308, it is determined whether the cooling load is greater than a sum of the capacity of the fixed-speed compressor 102 and the rated minimum capacity of the variable-speed speed compressor 104. From step 308, if it is determined that the measured cooling load is greater than a sum of the capacity of the fixed-speed compressor 102 and the rated minimum capacity of the variable-speed compressor 104, the process 300 proceeds to step 310. At step 310, the fixed-speed compressor 102 runs continuously and the speed of the variable-speed compressor 104 is modulated to a value between the minimum rated speed and the maximum rated speed of the variable-speed compressor 104 to match the measured cooling load. However, at step 308, if it is not determined that the measured cooling load is greater than a sum of the capacity of the fixed-speed compressor 102 and the rated minimum capacity of the variable-speed compressor 104, the process 300 proceeds to step 312.

At step 312, it is determined whether the measured cooling load is between the maximum capacity of the variable-speed compressor 104 and the sum of the rated minimum capacity of the variable-speed compressor 104 and the capacity of the fixed-speed compressor 102. From step 312, if it is determined that the measured cooling load is between the maximum capacity of the variable-speed compressor 104 and the sum of the rated minimum capacity of the variable-speed compressor 104 and the capacity of the fixed-speed compressor 102, the process proceeds to step 314. At step 314, the variable-speed compressor 104 runs at the rated minimum capacity and the fixed-speed compressor 102 cycles between an activated state and a deactivated state to match the measured cooling load. Alternatively, at step 314, the variable-speed compressor 104 is operated above a rated maximum capacity of the variable-speed compressor 104 and the fixed-speed compressor 102 is deactivated. From step 312, if it is determined that the measured cooling load is less the maximum capacity of the variable-speed compressor 104, the process 300 proceeds to step 316. At step 316, the fixed-speed compressor 102 is deactivated and the speed of the variable-speed compressor 104 is modulated to match the measured cooling load. In other embodiments, at step 316 the variable-speed compressor is cycled between an operational state at the rated minimum speed and a deactivated state in an effort to match the cooling load. At step 317, it is determined if the cooling cycle is complete. From step 317, if it is determined that the cooling cycle is not complete, the process 300 returns to step 304. From step 317, if it is determined that the cooling cycle is complete, the process 300 ends at step 318.

Figure 3B:
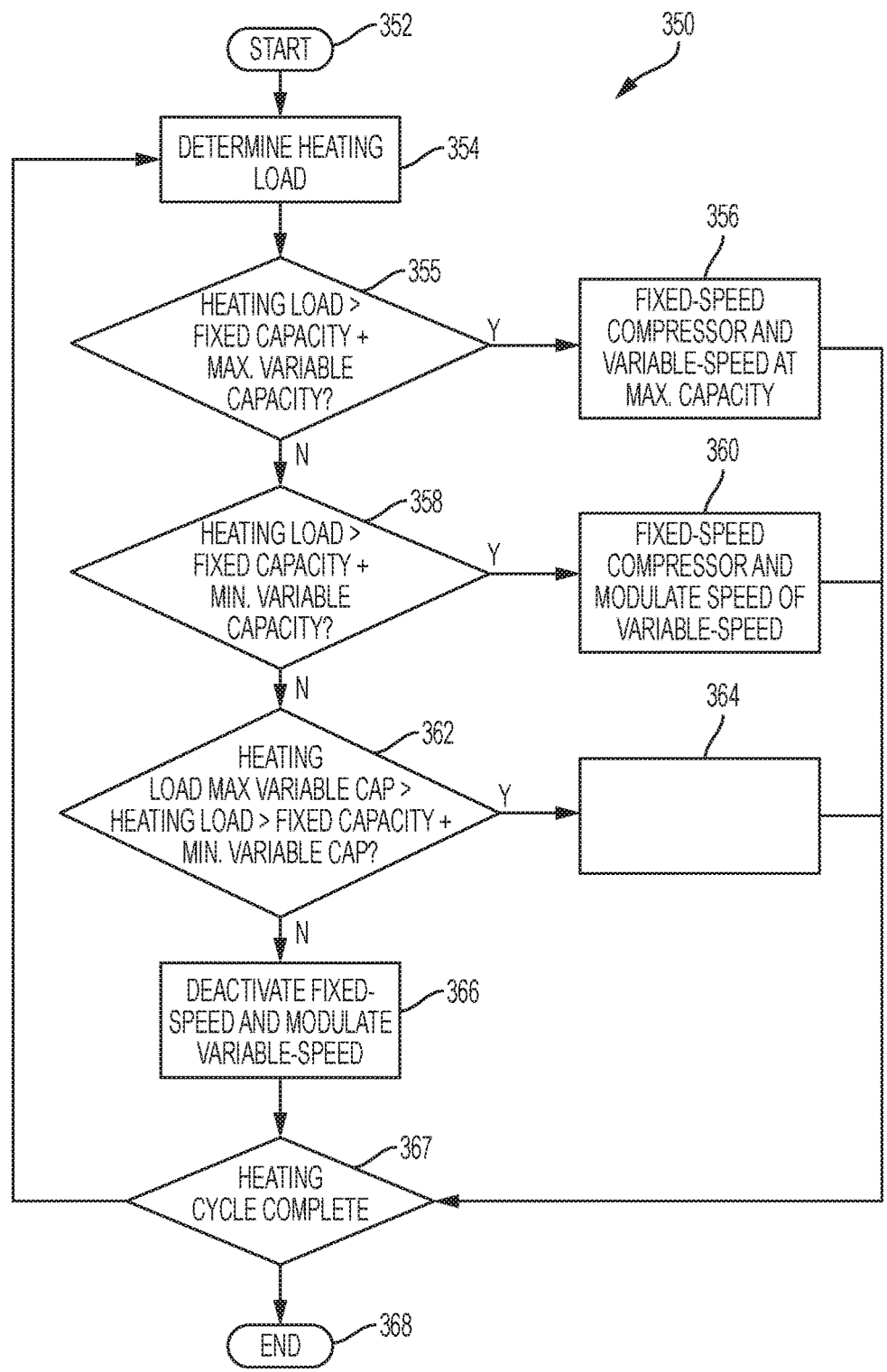
FIG. 3B is a flow diagram illustrating a process of using the illustrative tandem compressor system the heating mode.

FIG. 3B is a flow diagram illustrating a process 350 for using the illustrative tandem compressor system 100 in the heating mode. The process 350 begins at step 352. At step 354, the heating load of the enclosed space 101 is determined. At step 355, it is determined whether the heating load is greater than a sum of the capacity of the fixed-speed compressor 102 and the rated maximum capacity of the variable-speed compressor 104. From step 355, if it is determined that the heating load is greater than a sum of the capacity of the fixed-speed compressor 102 and the rated maximum capacity of the variable-speed compressor 104, the process 350 proceeds to step 356. At step 356, the fixed-speed compressor 102 is run continuously and the variable-speed compressor 104 runs continuously at the rated maximum speed or above the rated maximum speed in an effort to match the measured heating load. At step 355, if it is determined that the heating load is less than a sum of the capacity of the fixed-speed compressor 102 and the rated maximum capacity of the variable-speed compressor 104, the process 350 proceeds to step 358.

At step 358, it is determined whether the heating load is greater than a sum of the capacity of the fixed-speed compressor 102 and the rated minimum capacity of the variable-speed compressor 104. From step 358, if it is determined that the measured heating load is greater than a sum of the capacity of the fixed-speed compressor 102 and the rated minimum capacity of the variable-speed compressor 104, the process 350 proceeds to step 360. At step 360, the fixed-speed compressor 102 runs continuously and the speed of the variable-speed compressor 104 is modulated to match the measured heating load. At step 358, if it is not determined that the measured heating load is greater than a sum of the capacity of the fixed-speed compressor 102 and the rated minimum capacity of the variable-speed compressor 104, the process 350 proceeds to step 362.

At step 362, it is determined whether the measured heating load is between the rated maximum capacity of the variable-speed compressor 104 and the sum of the rated minimum capacity of the variable-speed compressor 104 and the capacity of the fixed-speed compressor 102. From step 362, if it is determined that the measured heating load is between the rated maximum capacity of the variable-speed compressor 104 and the sum of the rated minimum capacity of the variable-speed compressor 104 and the capacity of the fixed-speed compressor 102, the process proceeds to step 364. At step 364, the variable-speed compressor 104 runs at the rated minimum speed and the fixed-speed compressor 102 cycles between an activated state and a deactivated state to match the measured heating load. Alternatively, at step 364, the variable-speed compressor 104 is operated above a rated maximum capacity of the variable-speed compressor 104 and the fixed-speed compressor 102 is deactivated.

From step 362, if it is determined that the measured heating load is less the rated maximum capacity of the variable-speed compressor 104, the process 350 proceeds to step 366. At step 366, the fixed-speed compressor 102 is deactivated and the speed of the variable-speed compressor 104 is modulated to match the measured heating load. At step 367, it is determined whether the heating cycle is complete. From step 367, if it is determined that the heating cycle is not complete, the process 350 returns to step 354. From step 367, if it is determined that the heating cycle is complete, the process 350 ends at step 368.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:
1. A compressor system comprising:
a variable-speed compressor;
a fixed-speed compressor;

a control unit operatively coupled to the variable-speed compressor and operatively coupled to the fixed-speed compressor;

a sensor operatively coupled to the control unit and disposed in an enclosed space, the sensor measuring at least one of a temperature and a relative humidity of the enclosed space;

wherein the control unit determines an HVAC load based at least in part on the at least one of the temperature and the relative humidity measured by the sensor; and wherein the control unit is configured to:

responsive to a determination that the HVAC load is between a maximum capacity of the variable-speed compressor and a sum of a minimum capacity of the variable-speed compressor and a capacity of the fixed-speed compressor, maintain the variable-speed compressor at the minimum capacity while cycling the fixed-speed compressor between an activated state and a deactivated state.

2. The compressor system of claim 1, wherein the control unit is configured to modulate a speed of the variable-speed compressor to a value between a rated minimum speed and a rated maximum speed of the variable-speed compressor.

3. The compressor system of claim 1, wherein the HVAC load is a cooling load.

4. The compressor system of claim 1, wherein the HVAC load is a heating load.

5. The compressor system of claim 1, wherein the sensor and the control unit are integral.

6. A method of controlling an HVAC system, the method comprising:

measuring, using a sensor, environmental conditions of an enclosed space;

responsive to the measuring, determining, using a control unit, an HVAC load present in the enclosed space;

comparing the HVAC load to a rated minimum capacity of a variable-speed compressor, a rated maximum capacity of the variable-speed compressor, and a capacity of a fixed-speed compressor; and responsive to a determination that the HVAC load is between a maximum capacity of the variable-speed compressor and a sum of a minimum capacity of the variable-speed compressor and a capacity of the fixed-speed compressor, maintain the variable-speed compressor at the minimum capacity while cycling the fixed-speed compressor between an activated state and a deactivated state.

7. The method of claim 6, wherein the HVAC load is a cooling load.

8. The method of claim 6, wherein the HVAC load is a heating load.

9. The method of claim 6, comprising:

responsive to a determination that the HVAC load is less than the rated maximum capacity of the variable-speed compressor, deactivating, using the control unit, the fixed-speed compressor and modulating, using the control unit, a speed of the variable-speed compressor to a value between a rated minimum speed and a rated maximum speed of the variable-speed compressor.

10. The method of claim 6, wherein:

responsive to a determination that the HVAC load is greater than a sum of the rated minimum capacity of the variable-speed compressor and the capacity of the fixed-speed compressor, operating, using the control unit, the fixed-speed compressor continuously and modulating, using the control unit, a speed of the variable-speed compressor to a value between a rated minimum speed and a rated maximum speed of the variable-speed compressor.

11. The method of claim 6, comprising:

responsive to a determination that the HVAC load is greater than a sum of the rated maximum capacity of the variable-speed compressor and a capacity of the fixed-speed compressor, operating, using the control unit, the fixed-speed compressor continuously and operating, using the control unit, the variable-speed compressor at the rated maximum speed.

12. A computer-program product comprising a non-transitory computer-usable medium having computer-readable program code embodied therein, the computer-readable program code adapted to be executed to implement a method comprising:

receiving from a sensor a signal corresponding to a measurement of environmental conditions in an enclosed space;

determining, based on the environmental conditions, an HVAC load present in the enclosed space;

comparing the HVAC load to a rated minimum capacity of a variable-speed compressor, a rated maximum capacity of the variable-speed compressor, and a capacity of a fixed-speed compressor; and responsive to a determination that the HVAC load is between a maximum capacity of the variable-speed compressor and a sum of a minimum capacity of the variable speed compressor and a capacity of the fixed-speed compressor, signaling the variable-speed compressor to maintain operation at minimum capacity while signaling the fixed-speed compressor to cycle between an activated state and a deactivated state.

13. The computer-program product of claim 12, wherein:

responsive to a determination that the HVAC load is less than the rated maximum capacity of the variable-speed compressor, signaling the fixed-speed compressor to deactivate and signaling the variable-speed compressor modulate a speed of the variable-speed compressor to a value between a rated minimum speed and a rated maximum speed of the variable-speed compressor.

14. The computer-program product of claim 12, wherein:

responsive to a determination that the HVAC load is greater than a sum of the rated minimum capacity of the variable-speed compressor and the capacity of the fixed-speed compressor, signaling the fixed-speed compressor to operate continuously and signaling the variable-speed compressor to modulate a speed of the variable-speed compressor to a value between a rated minimum speed and a rated maximum speed of the variable-speed compressor.

15. The computer-program product of claim 12, wherein:

responsive to a determination that the HVAC load is greater than a sum of the rated maximum capacity of the variable-speed compressor and the capacity of the fixed-speed compressor, signaling the fixed-speed compressor to operate continuously and signaling the variable-speed compressor to operate at the rated maximum speed.

* * * * *

UNITED STATES PATENT AND TRADEMARK OFFICE
CERTIFICATE OF CORRECTION

PATENT NO. : 10,465,937 B2
APPLICATION NO. : 15/671243
DATED : November 5, 2019
INVENTOR(S) : Eric Berg et al.

Page 1 of 1

It is certified that error appears in the above-identified patent and that said Letters Patent is hereby corrected as shown below:

In the Specification

Column 3, Line 64    Replace "and the like, in other embodiments," with "and the like. In other embodiments,"

Column 6, Line 11    Replace "102 runs continuous in an effort to match" with "102 runs continuously in an effort to match"

Column 8, Line 47    Replace "variable-speed speed compressor 104." with "variable-speed compressor 104."

Signed and Sealed this
Twenty-fifth Day of February, 2020

Andrei Iancu
*Director of the United States Patent and Trademark Office*